US012805514B2

(12) United States Patent
Dennis et al.

(10) Patent No.: US 12,805,514 B2
(45) Date of Patent: Nov. 24, 2026

(54) CAMOUFLAGE COVERING FOR LADDERSTAND

(71) Applicants: Frank C. Dennis, North Ridgeville, OH (US); Donald G. Dennis, Elyria, OH (US)

(72) Inventors: Frank C. Dennis, North Ridgeville, OH (US); Donald G. Dennis, Elyria, OH (US)

( * ) Notice: Subject to any disclaimer, the term of this patent is extended or adjusted under 35 U.S.C. 154(b) by 266 days.

(21) Appl. No.: 18/221,750

(22) Filed: Jul. 13, 2023

(65) Prior Publication Data

US 2023/0413803 A1 Dec. 28, 2023

Related U.S. Application Data

(63) Continuation-in-part of application No. 16/354,171, filed on Mar. 15, 2019, now abandoned.

(60) Provisional application No. 62/643,687, filed on Mar. 15, 2018.

(51) Int. Cl.
*A01M 31/02* (2006.01)
*E06C 7/00* (2006.01)
*F41H 3/02* (2006.01)

(52) U.S. Cl.
CPC ........... *A01M 31/025* (2013.01); *E06C 7/006* (2013.01); *F41H 3/02* (2013.01)

(58) Field of Classification Search
CPC ..... A01M 31/025; A01M 31/02; E06C 7/185; E06C 7/183; E06C 7/18; E06C 7/006; F41H 3/02; E04H 15/001; E04H 15/003; E04H 15/04
USPC .......................... 182/129; 135/900, 901, 902
See application file for complete search history.

(56) References Cited

U.S. PATENT DOCUMENTS 268,078 A 11/1882 Bushnell
591,457 A * 10/1897 Davis ...................... E04H 15/44 135/121
913,117 A * 2/1909 Feyma ..................... A62B 1/20 193/32
969,899 A * 9/1910 Partington .............. E04H 15/04 135/90
1,803,626 A * 5/1931 Lasley .................. E04H 1/1244 135/902
1,990,804 A * 2/1935 Watson ................. E04H 15/003 135/904
2,023,155 A * 12/1935 Turner .................. E04H 15/003 248/156
2,196,544 A * 4/1940 Bagley .................. E04H 15/003 256/25
2,335,648 A * 11/1943 Bryson ................. E04H 15/322 135/120.4
2,539,664 A * 1/1951 Hay ........................ E06C 7/185 182/230
3,288,157 A * 11/1966 Szkolny .................... A45F 4/04 135/117

(Continued)

*Primary Examiner* — Daniel P Cahn
*Assistant Examiner* — Shiref M Mekhaeil
(74) *Attorney, Agent, or Firm* — The Webb Law Firm

(57) ABSTRACT

The present invention relates to a flexible ladder cover for a ladder, ladder stand, or ladder stick, and to methods of deploying same. In one instance, the present invention relates to a flexible ladder cover designed to camouflage a ladder, to camouflage a ladder of a ladder stand, or to camouflage a ladder stick so as to conceal same and to methods for deploying same for concealment purposes.

12 Claims, 5 Drawing Sheets

(56) References Cited

U.S. PATENT DOCUMENTS

| | | | | | |
|---|---|---|---|---|---|
| 3,348,630 | A * | 10/1967 | Yamamoto | A62B 1/20 | 182/48 |
| 3,404,696 | A * | 10/1968 | De Souza Filho | E04H 15/003 | 135/904 |
| 3,994,366 | A * | 11/1976 | Okuma | B63C 9/22 | 182/48 |
| 4,224,754 | A * | 9/1980 | Derryberry | A01M 31/025 | 135/117 |
| 4,240,520 | A * | 12/1980 | LaGrone | A62B 1/20 | 182/47 |
| 4,332,266 | A * | 6/1982 | Wageley | E04H 15/001 | 135/901 |
| 4,505,286 | A * | 3/1985 | Madion | A01M 31/02 | 135/117 |
| 4,524,848 | A * | 6/1985 | Russo | E06C 7/185 | 182/92 |
| 4,595,074 | A * | 6/1986 | Nordtvedt | A62B 1/20 | 182/48 |
| 4,605,095 | A * | 8/1986 | Koizumi | A62B 1/20 | 182/48 |
| 4,681,186 | A * | 7/1987 | Leisman | A62B 1/20 | 182/47 |
| 4,682,448 | A * | 7/1987 | Healey | E04G 23/00 | 135/900 |
| 4,761,908 | A * | 8/1988 | Hayes | E04H 15/001 | 43/1 |
| 4,778,031 | A * | 10/1988 | Curiel | A62B 1/20 | 182/47 |
| 4,934,396 | A * | 6/1990 | Vitta | E04H 1/1277 | 135/148 |
| 4,951,696 | A * | 8/1990 | Jones, Sr. | A01M 31/025 | 135/901 |
| 4,966,181 | A * | 10/1990 | Liberman | E04H 15/003 | 135/902 |
| 5,301,706 | A * | 4/1994 | Jones | E04H 15/001 | 135/141 |
| 5,385,164 | A * | 1/1995 | Sauter | E04H 15/001 | 135/900 |
| 5,454,037 | A * | 9/1995 | Pacella | H04M 1/68 | 379/453 |
| 5,520,364 | A * | 5/1996 | Bloxson | A47G 9/062 | 248/500 |
| 5,562,184 | A * | 10/1996 | Yung-Ho | A62B 1/20 | 182/48 |
| 5,592,961 | A * | 1/1997 | Chin | E04H 1/1244 | 135/117 |
| 5,669,403 | A * | 9/1997 | Belcher | A01M 31/025 | 135/900 |
| 5,682,960 | A * | 11/1997 | Mobley | E06C 7/00 | 182/129 |
| 5,733,187 | A * | 3/1998 | Bowe | B05B 16/00 | 454/52 |
| 5,735,608 | A * | 4/1998 | Branco | A45C 3/00 | 383/41 |
| 5,915,400 | A * | 6/1999 | Pohl | E04H 15/44 | 135/117 |
| 6,098,747 | A * | 8/2000 | Reece | A62B 1/20 | 182/48 |
| D434,890 | S * | 12/2000 | Cooper | D34/1 | |
| 6,237,534 | B1 * | 5/2001 | Schwartz | A01K 1/0125 | 119/165 |
| 6,427,523 | B1 * | 8/2002 | Seabrook | G01M 3/146 | 73/40.7 |
| 6,467,575 | B1 * | 10/2002 | Chen | A62B 1/20 | 182/48 |
| 6,672,322 | B1 * | 1/2004 | Littlefield | A22C 15/008 | 452/187 |
| 6,830,170 | B2 * | 12/2004 | Abel | A45F 3/04 | 224/656 |
| 6,899,201 | B2 * | 5/2005 | Thiessen | E06C 7/185 | 182/230 |
| 7,040,033 | B2 | 5/2006 | Zhu et al. | | |
| 7,182,091 | B2 * | 2/2007 | Maddox | A01M 31/025 | 182/135 |
| 7,188,636 | B1 * | 3/2007 | Kanne | E04G 21/243 | 135/900 |
| 7,237,753 | B2 * | 7/2007 | Metcalfe | B65B 67/1238 | 193/15 |
| D577,851 | S * | 9/2008 | Yurich | D26/119 | |
| 7,556,052 | B2 * | 7/2009 | Wright | A01M 31/025 | 135/117 |
| 7,556,124 | B2 * | 7/2009 | Hafliger | A62B 1/20 | 182/48 |
| 7,559,334 | B2 * | 7/2009 | Cooper | E04H 15/04 | 135/901 |
| 7,849,866 | B1 * | 12/2010 | Mangum | A47K 11/04 | 4/476 |
| 8,177,028 | B2 * | 5/2012 | Durkin | E21F 11/00 | 182/128 |
| 8,201,571 | B1 * | 6/2012 | Smith | E04H 15/04 | 135/117 |
| 8,316,991 | B2 * | 11/2012 | Akselsen | B63C 9/28 | 182/48 |
| 8,375,968 | B2 * | 2/2013 | Whybrew | E04H 15/38 | 135/96 |
| 8,381,749 | B1 * | 2/2013 | Ashmore, Jr. | E04H 15/001 | 135/96 |
| 8,511,895 | B2 * | 8/2013 | Burchfield | B65F 1/1415 | 383/33 |
| 9,156,616 | B1 * | 10/2015 | Margino | B65G 11/186 | |
| 9,212,001 | B2 * | 12/2015 | Brandon | B65G 11/026 | |
| 9,526,208 | B2 * | 12/2016 | Zamirpour | A01D 46/26 | |
| D777,947 | S * | 1/2017 | Simmons | D25/64 | |
| 9,993,123 | B2 * | 6/2018 | Moise | E04H 1/1216 | |
| 10,034,436 | B2 * | 7/2018 | Legus | B29C 45/14622 | |
| 10,448,630 | B2 * | 10/2019 | Boren | E04H 15/54 | |
| 10,704,281 | B1 * | 7/2020 | Stahlhut | E04H 15/003 | |
| 10,859,460 | B2 * | 12/2020 | DeLadurantaye | G01M 3/146 | |
| 11,035,144 | B2 * | 6/2021 | Pilcher | E04H 15/28 | |
| 11,261,615 | B1 * | 3/2022 | Boren | E04H 15/04 | |
| 2002/0036007 | A1 * | 3/2002 | Sellers | E04H 15/04 | 135/21 |
| 2002/0094237 | A1 * | 7/2002 | Coffey | E02B 11/005 | 405/36 |
| 2003/0218039 | A1 * | 11/2003 | Abel | A45F 3/04 | 224/656 |
| 2006/0005870 | A1 * | 1/2006 | Maddox | E04H 15/001 | 135/90 |
| 2007/0209870 | A1 * | 9/2007 | Johnson | A62B 1/20 | 182/49 |
| 2008/0056625 | A1 * | 3/2008 | Stanton | B65F 1/0006 | 220/9.3 |
| 2008/0116007 | A1 * | 5/2008 | Johnson | E06C 1/56 | 182/48 |
| 2017/0245491 | A1 | 8/2017 | Seaton et al. | | |
| 2017/0295774 | A1 * | 10/2017 | Boren | A01M 31/025 | |
| 2021/0289743 | A1 * | 9/2021 | Specha | E06C 7/00 | |

* cited by examiner

CAMOUFLAGE COVERING FOR LADDERSTAND

CROSS-REFERENCE TO RELATED APPLICATIONS

The present application is a continuation-in-part of and claims priority to U.S. patent application Ser. No. 16/354,171, filed on Mar. 15, 2019, which is a non-provisional of U.S. Provisional Application No. 62/643,687, filed on Mar. 15, 2018, the disclosures of which are incorporated by reference herein in their entireties.

BACKGROUND OF THE INVENTION

Field of the Invention

The present invention relates to covers for ladder stands and to methods of deploying same. In particular, the invention relates to camouflage covers for ladder stands designed to conceal same and to methods for deploying same.

Description of the Related Art

Hunters gain an advantage over their prey by perching up higher than ground level. Deer, turkeys and other animals are less likely to see, smell or otherwise sense a hunter who is above the animals' sightline. Hunters commonly use a free standing deer stand, which is a seat with long legs and a ladder providing access to the seat from the ground. If an appropriate tree is available, hunters use various mechanisms to climb the tree and attach a seat to the tree. Another option is to use a ladder tree stand which consists of a ladder and a seat which attaches securely to a tree trunk at the seat level.

A ladder tree stand user may wish to camouflage the lower ladder portion of the tree stand, to hide it from animals and people. Ladders on existing tree stands may be painted or otherwise coated with a camouflage design.

SUMMARY OF THE INVENTION

In one embodiment, the present invention relates to a cover for the ladder portion of a ladder tree stand. In one instance, the cover of the present invention folds down flat before installation, and is unfolded and pulled up the ladder as the hunter ascends the ladder, then the top edge of the cover is secured at the seat level so that the ladder remains covered for so long as the hunter remains up on the seat.

In one embodiment, the present invention relates to a ladder cover for a ladder, ladder stand, or ladder stick, the ladder cover comprising: a ladder cover, wherein the ladder cover has a length that is suitable to cover substantially all of the height of the ladder, ladder stand, or stick ladder to be covered, the ladder cover comprising: a flexible cover portion formed from a suitable fabric or other flexible material, wherein the length of the flexible cover portion is at least as long as the height of the ladder, ladder stand, or stick ladder it is intended to cover; and a plurality of hoops that are all sewn, or otherwise attached, to one surface of the flexible cover portion, wherein the plurality of hoops are located at suitable intervals from a bottom edge to a top edge of the ladder cover such that all of the plurality of hoops are oriented to be substantially parallel with the bottom and top edges of the ladder cover, wherein each of the plurality of hoops is formed to have a desired geometric shape and size that fits horizontally around the ladder, ladder stand, or ladder stick, and wherein both the flexible cover portion and all of the plurality of hoops each individually have an opening or gap therein such that when the opening or gap of the flexible cover portion is aligned with all of the openings or gaps of the plurality of hoops a slit or gap running vertically along the entire height of the extended ladder cover is formed.

In another embodiment, the ladder cover of the present invention relates to a ladder cover where each of the plurality of the hoops are made of wire, plastic or other material which is flexible but retains a desired shape.

In still another embodiment, the ladder cover of the present invention relates to a ladder cover where the flexible cover portion has a plurality of bottom holes suitable to secure the bottom of the flexible cover portion to the ground with stakes.

In still another embodiment, the ladder cover of the present invention relates to a ladder cover where the flexible cover portion has a plurality of grommet reinforced bottom holes suitable to secure the bottom of the flexible cover portion to the ground with stakes.

In still another embodiment, the ladder cover of the present invention relates to a ladder cover where the flexible cover portion has a plurality of top holes suitable to secure the top of the flexible cover portion to any suitable attachment point at the top of the ladder, ladder stand, or stick ladder.

In still another embodiment, the ladder cover of the present invention relates to a ladder cover where the flexible cover portion has a plurality of grommet reinforced top holes suitable to secure the top of the flexible cover portion to any suitable attachment point at the top of the ladder, ladder stand, or stick ladder.

In still another embodiment, the ladder cover of the present invention relates to a ladder cover where the flexible cover portion has a plurality of top holes suitable to secure the top of the flexible cover portion to one or more of a seat, an arm rest, a gun rail, or other top portion of the ladder, ladder stand, or stick ladder.

In still another embodiment, the ladder cover of the present invention relates to a ladder cover further comprising a plurality of cords designed to permit the raising and lowering of the flexible cover portion via at least one of the plurality of bottom holes and/or the plurality of top holes.

In still another embodiment, the ladder cover of the present invention relates to a ladder cover where the plurality of cords each have a length that is approximately twice as long as the height of the ladder, ladder stand, or stick ladder and/or flexible cover portion.

In still another embodiment, the ladder cover of the present invention relates to a ladder cover where the plurality of cords are designed to be attached to the top of the ladder via a ring and bolt.

In still another embodiment, the ladder cover of the present invention relates to a ladder cover where the ring and bolt can further be securely connected to the top of the ladder.

In still another embodiment, the ladder cover of the present invention relates to a ladder cover where the plurality of hoops are spaced about 12 inches apart along the entire length, or height, of the flexible cover portion.

DETAILED DESCRIPTION OF THE INVENTION

Figure 1:
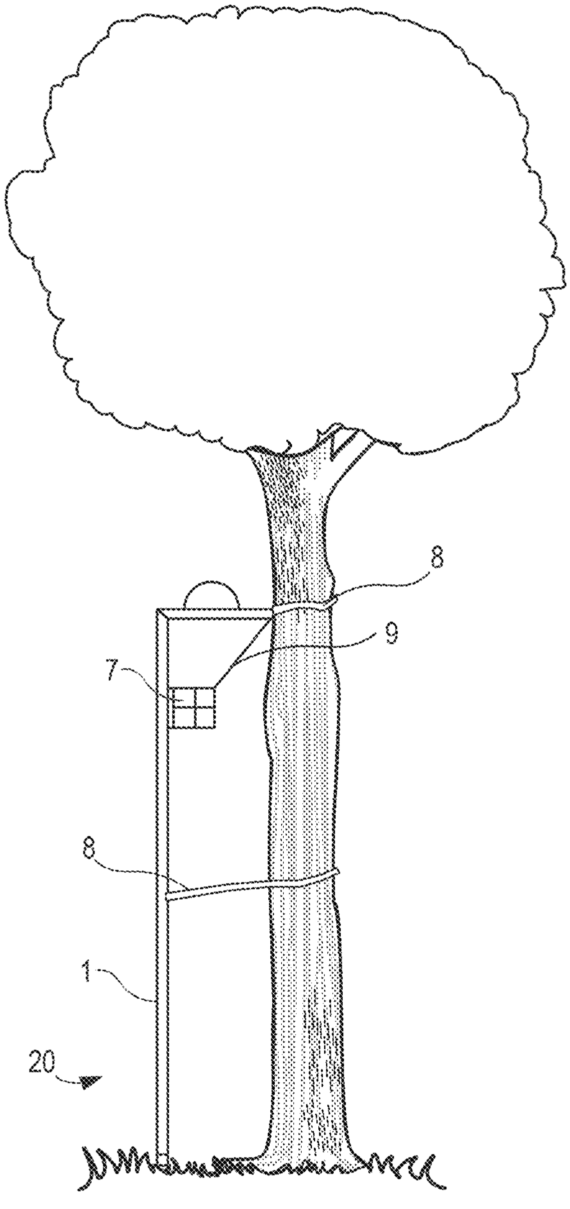
FIG. 1 is a side view of an exemplary ladder tree stand.
Figure 2:
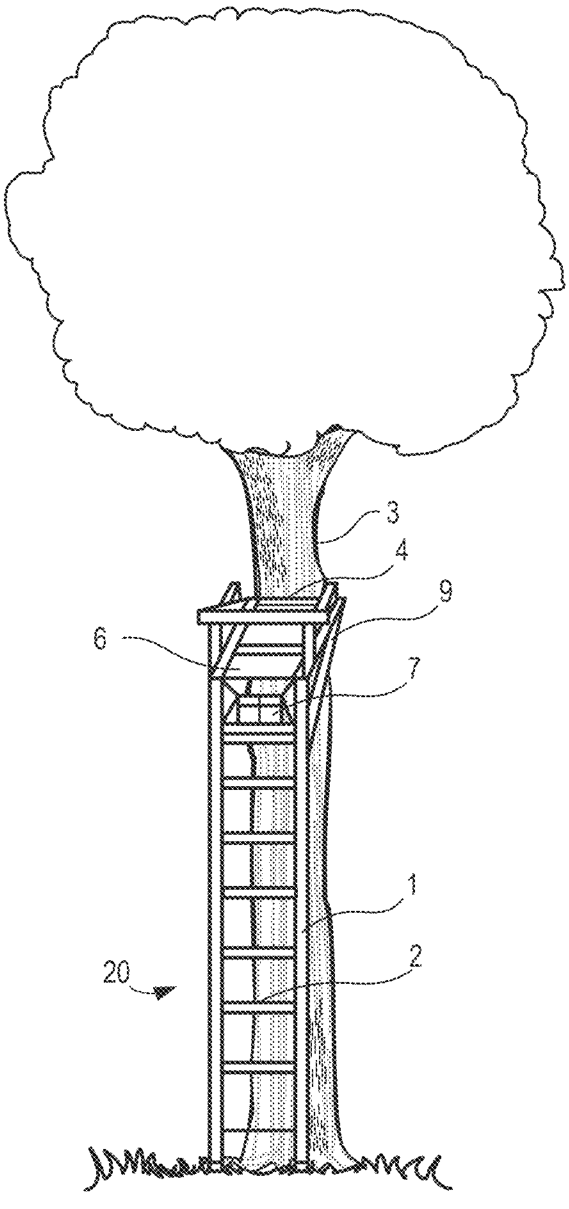
FIG. 2 is a front view of an exemplary ladder tree stand, shown against a tree trunk.
Figure 3:
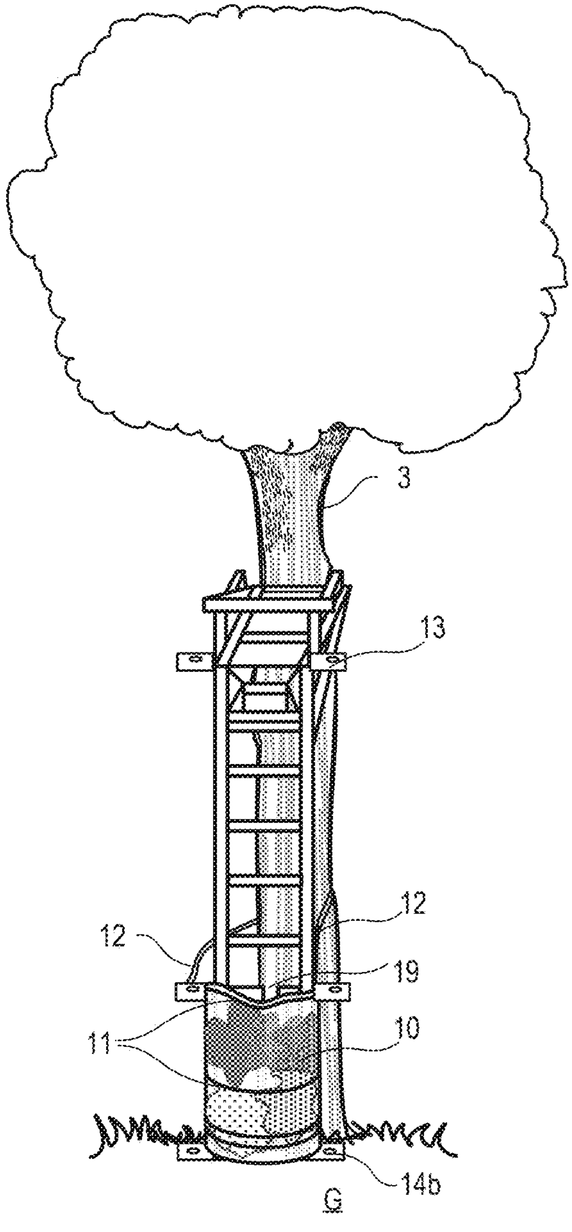
FIG. 3 is a front view of the cover shown partially unfolded and extended up the ladder of a tree stand.
Figure 4:
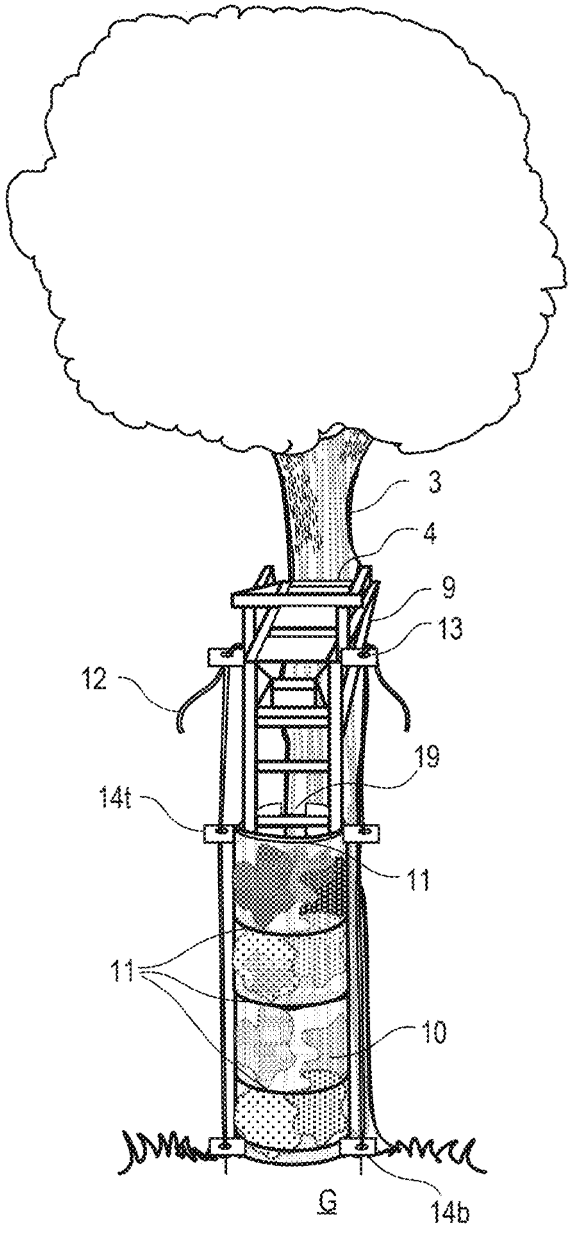
FIG. 4 is a front view of the cover almost completely unfolded and extended up the ladder of a tree stand, with the bottom of the cover staked into the ground and the cords slipped through the rings of the seat portion, but not yet secured.

As noted above, in one embodiment, the present invention is a cover 10 for the ladder portion of a ladder tree stand. In one embodiment, cover 10 (see, for example, FIGS. 3, 4, and 6) can be made of fabric, vinyl, canvas, a spun-bonded olefin sheet material such as Tyvek®, or other fabric-like material, with a plurality of hoops 11 sewn or otherwise attached to the material, which hoops have an opening 19 behind the ladder. In one embodiment, cover 10 can be formed from a material that can be imprinted with any suitable pattern including, but not limited to, a camouflage pattern. In one embodiment, hoops 11 can be made of steel, stainless steel, brass, copper, fiberglass, wire, or any other metal, metal alloy, plastic or other material which is flexible but retains a desired shape. Hoops 11 can be shaped as circles, ovals, rectangles, or similar shapes which will horizontally surround the ladder. Depending on the height of the ladder to be concealed, any suitable number of hoops 11 can be used in conjunction with cover 10. In one embodiment, hoops 11 are spaced about 6 inches, 9 inches, 12 inches, or even 18 inches apart along the entire height of cover 10. A ladder 20 on a ladder tree stand is often about 16 feet to about 20 feet tall, and cover 10 must be long enough to cover the ladder portion of a ladder tree stand completely, as shown in FIG. 2-6.

Regarding ladder 20, or an equivalent stick ladder 22, ladder 20 is commonly attached to the trunk of a suitable tree 3 via any suitable attachment means including, but not limited to, one or more support bar and cam strap combinations 8. As would be apparent, typical ladder, or stick ladders, use a plurality of attachment points 8 spaced out along suitable intervals along the complete height of the ladder 20, or stick ladder 22. In one embodiment, any suitable attachment means for attaching ladder 20, or its equivalent, to the trunk of tree 3 is spaced out every 3 feet, 4, feet, 5, feet, 6, feet, 7, feet, or even every 8 feet or more along the complete height of ladder 20. In another embodiment, regardless of how many attachment points 8 are spaced along the height of ladder 20, there is also an attachment point 5 for tree 3 at the top of ladder 20. In one embodiment, attachment points 8 can also double as support points that ensure ladder 20, or stick ladder 22, is securely anchored to tree 3. As would be apparent to those of skill in the art, the number of attachment points, or support points, 8 depends on the height, weight, and/or width of ladder 20, or stick ladder 22. As such, any suitable number of attachment points, or support points, 8 can be used in conjunction with ladder 20, or stick ladder 22, so as to securely anchor ladder 20, or stick ladder 22, to tree 3. Accordingly, the number of attachment points, or support points, 8 used in conjunction with ladder 20, or stick ladder 22, is not critical to the operation of the present invention. Additionally, it should be noted that stick ladder 22 can also have one or more spacers (not shown) that are located between various points of the center of stick ladder 22 and the trunk of tree 3. Such spacers act to bias stick ladder 22 a suitable distance from the trunk of tree 3 so that there is suitable space between stick ladder 22 and the trunk of tree 3 for a user to have room for their feet when climbing stick ladder 22. Again, any suitable number of spacers having a desired shape can be used in conjunction with stick ladder 22. Accordingly, the number of any one or more spacers used in conjunction with stick ladder 22 is not critical to the operation of the present invention.

As such, cover 10 of the present invention is not limited to any one specific length but can be any suitable height including, but not limited to, about 6 feet tall, about 7 feet tall, about 8 feet tall, about 9 feet tall, about 10 feet tall, about 11 feet tall, about 12 feet tall, about 13 feet tall, about 14 feet tall, about 15 feet tall, about 16 feet tall, about 17 feet tall, about 18 feet tall, about 19 feet tall, about 20 feet tall, about 21 feet tall, about 22 feet tall, about 23 feet tall, about 24 feet tall, about 25 feet tall, about 26 feet tall, about 27 feet tall, about 28 feet tall, about 29 feet tall, or even about 30 feet tall or more. Here, as well as elsewhere in the specification and claims, individual numerical values can be combined to form additional, or even new/non-disclosed, numerical ranges.

In another embodiment, due to the material used to form cover 10, cover 10 can be designed to be adjustable to a range of ladder heights such as about 6 feet tall to about 8 feet tall, about 7 feet tall to about 9 feet tall, about 8 feet tall to about 10 feet tall, about 9 feet tall to about 11 feet tall, about 10 feet tall to about 12 feet tall, about 11 feet tall to about 13 feet tall, about 12 feet tall to about 14 feet tall, about 13 feet tall to about 15 feet tall, about 14 feet tall to about 16 feet tall, about 15 feet tall to about 17 feet tall, about 16 feet tall to about 18 feet tall, about 17 feet tall to about 19 feet tall, about 18 feet tall to about 20 feet tall, about 19 feet tall to about 21 feet tall, about 20 feet tall to about 22 feet tall, about 21 feet tall to about 23 feet tall, about 22 feet tall to about 24 feet tall, about 23 feet tall to about 25 feet tall, about 24 feet tall to about 26 feet tall, about 25 feet tall to about 27 feet tall, about 26 feet tall to about 28 feet tall, about 27 feet tall to about 29 feet tall, or even about 28 feet tall to about 30 feet tall. Here, as well as elsewhere in the specification and claims, individual numerical values can be combined to form additional, or even new/non-disclosed, numerical ranges.

In still another embodiment, due to the material used to form cover 10, cover 10 can be designed to be adjustable to a range of ladder heights such as about 6 feet tall to about 10 feet tall, about 8 feet tall to about 12 feet tall, about 10 feet tall to about 14 feet tall, about 12 feet tall to about 16 feet tall, about 14 feet tall to about 18 feet tall, about 16 feet tall to about 20 feet tall, about 18 feet tall to about 22 feet tall, about 20 feet tall to about 24 feet tall, about 22 feet tall to about 26 feet tall, about 24 feet tall to about 28 feet tall, or even about 26 feet tall to about 30 feet tall. Again, here, as well as elsewhere in the specification and claims, individual numerical values can be combined to form additional, or even new/non-disclosed, numerical ranges.

In one embodiment, hoops 11 are attached to cover 10 at the bottom and top edges, and then at approximately every 6 inch interval, every 8 inch interval, every 10 inch interval, or even every 12 inch interval between the bottom and top edges along the entire height of cover 10. Standard ladder stands range from 30 to 60 cm (12 to 24 inches) wide, while stick ladders are typically 6 or so inches wide. Hoops 11 must be wide enough to accommodate whatever width the ladder 20, or stick ladder 22, might be, and able to freely slide up the ladder. In one embodiment, hoops 11 are at least 6 inches wide, 8 inches wide, 10 inches wide, 12 inches wide, 14 inches wide, 16 inches wide, 18 inches wide, 20 inches wide, 22 inches wide, 24 inches wide, 26 inches wide, 28 inches wide, 30 inches wide, 32 inches wide, 34 inches wide, 36 inches wide, 38 inches wide, 40 inches wide, 42 inches wide, 44 inches wide, 46 inches wide, or even 48 inches wide. Again, here, as well as elsewhere in the specification and claims, individual numerical values can be combined to form additional, or even new/non-disclosed, numerical ranges. In another embodiment, hoops 11 can be any width so long as hoops 11 are wide enough to surround the ladder 20, or stick ladder 22, to be covered and are able to pass freely up and down such ladder 20, or stick ladder 22.

Cover 10 is designed to encircle and surround ladder 20, and has an opening, gap, or slit 19 that extends along the entire height of cover 10. In one embodiment, opening, gap, or slit, 19 works in conjunction with hoops 11 that are formed in a C-shape or U-shape (or any other suitable geometric shape) that has a gap, opening, or space present in hoops 11 such that opening 24 in each individual hoop 11 is able to be aligned with opening, gap, or slit 19 in the fabric or other flexible material that forms cover 10 and that extends essentially entire height of cover 10 (see FIG. 8). It should be noted that the opening, gap, or slit 19 of cover 10 can be any suitable width so long as the width of opening, gap, or slit 19 is wide enough to permit cover 10 to be raised up to encircle and surround (or even "pass over") ladder 20 (or stick ladder 22) and pass over the one or more attachment points, or support points, 8 that secure ladder 20 (or stick ladder 22) to the trunk of tree 3. In another embodiment, opening, gap, or slit 19 of cover 10 is wide enough to permit cover 10 to be raised up to encircle and surround stick ladder 22 and pass over the one or more attachment points, or support points, 8 as well as any one or more spacers that secure and properly space stick ladder 22 to the trunk of tree 3. Given the above, in one embodiment, the width of opening, gap, or slit 19 is at least about 0.5 inches, about 1 inch, about 1.5, inches, about 2 inches, about 2.5 inches, about 3 inches, about 3.5 inches, about 4 inches, about 4.5 inches, about 5 inches, about 5.5 inches, or even about 6 inches. As would be appreciated, in one embodiment the overall width of opening, gap, or slit 19 is not wider than the width of hoops 11. In another embodiment, the overall width of opening, gap, or slit 19 in the material of cover 10 and opening 24 in hoops 11 is at least about 0.5 inches, about 1 inch, about 1.5, inches, about 2 inches, about 2.5 inches, about 3 inches, about 3.5 inches, about 4 inches, about 4.5 inches, about 5 inches, about 5.5 inches, or even about 6 inches.

In another embodiment, cover 10 can have a portion located at one end, typically the end that is staked to the ground that has a small non-gapped portion that forms a cup like bottom in cover 10. In use, opening, gap, or slit 19 is oriented in such a manner so as to be positioned between the backside of ladder 20 and tree 3 (i.e., the side of ladder 20 that is closest to tree 3) so as to permit cover 10 to slide past and fit around any support bar which can extend from the middle of any given ladder step 2, or even ladder 20, to tree 3. Given the design thereof, cover 10 is able to expand and collapse vertically like an accordion.

Cover 10, when fully elongated, extends from the ground at the bottom of ladder 20 up to seat level 6 with an appropriate seat 4. In one embodiment, seat 4 can have a foot rest 7 and is supported, if so desired, by one or more support beams 9. Cover 10 is installed in its collapsed form, by placing cover 10 around ladder 20 at ground level G. When installing cover 10, collapsed cover 10 can be placed on ground G first and the bottom of ladder 20 then placed inside of cover 10 (see FIG. 5). Alternatively, ladder 20 can be secured to tree 3 first and then collapsed cover 10 fitted around ladder 20 by horizontally slipping back opening, gap, or slit 19 of cover 10 past side rail 1 of ladder 20, pulling cover 10 horizontally past opposite side rail 1 to cover the bottom of ladder 20, and then rotating cover 10 so that long back opening, gap, or slit 19 is located between ladder 20 and the trunk of tree 3. As can be seen from FIGS. 5 and 6, due to being formed from a fabric, vinyl, canvas, a spun-bonded olefin sheet material such as Tyvek®, or other fabric-like material, flexible cover 10 is able to be collapsed substantially to less than one-half, less than one-third, less than one fourth, less than one-fifth, or even less than one sixth of flexible cover 10's extended height.

Figure 8:
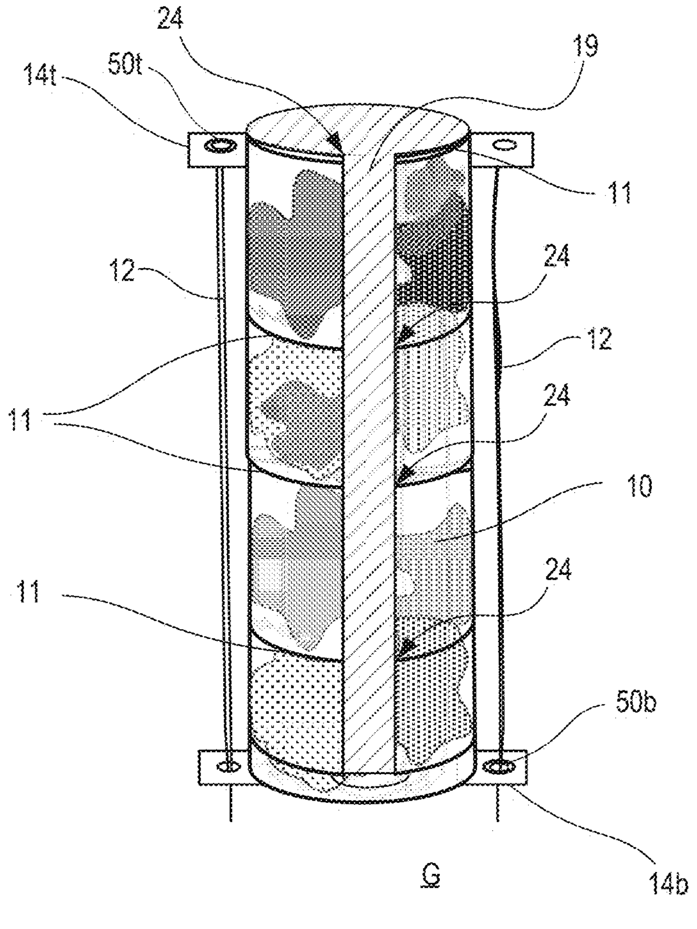
FIG. 8 is a rear view, from between the back of the ladder stand and the tree trunk to which it is attached, of the cover completely raised, unfolded and extended from the ground to the top of the ladder stand.

A plurality of holes **14*b*, which may or may not have reinforcing grommets (see, for example, top grommet 50*t* and/or bottom grommet 50*b*, both of FIG. 8), are located around the bottom edge of cover10, so that cover 10 can be secured via any suitable device, (for example, via stakes 15) to ground G through holes 14*b*. In one embodiment, the bottom edge of cover 10 has at least two, at least three, at least four, or even five or more holes 14*b* designed to permit cover 10 to be secured to ground G. In one alternative embodiment, a second plurality of holes 14*t*, which may or may not have reinforcing grommets, are located around the top edge of cover 10, so that cover 10 can be secured via any suitable device, (for example, via stakes 15) to ground G through holes. In one embodiment, ropes, or cords, 12 are attached to the top edge of cover 10 via the plurality of holes 14*t* (with, or without, grommets). In another embodiment, holes 14*t* can be replaced with any other desired attachment including, but not limited to, attachment slits in the top of the material of cover 10, attachment loops formed in the top most hoop 11, etc. In another embodiment, any suitable number of ropes, or cords 12 can be utilized including, but not limited to, three, four or even five ropes, or cords 12. When a hunter is ready to climb up to seat 4, the hunter steps inside cover 10 on ground G, and attaches ropes, or cords, 12 to their belt loops, or any other convenient place. The hunter may alternatively hold onto ropes, or cords, 12. Then, when the hunter climbs up the ladder 20, cover 10 is lifted and extends up ladder 20 behind the hunter, covering ladder 20**. For safety, the hunter should allow the cover to stay below his or her feet at least 30 centimeters (a foot), so there is no tripping hazard.

Figure 7A:
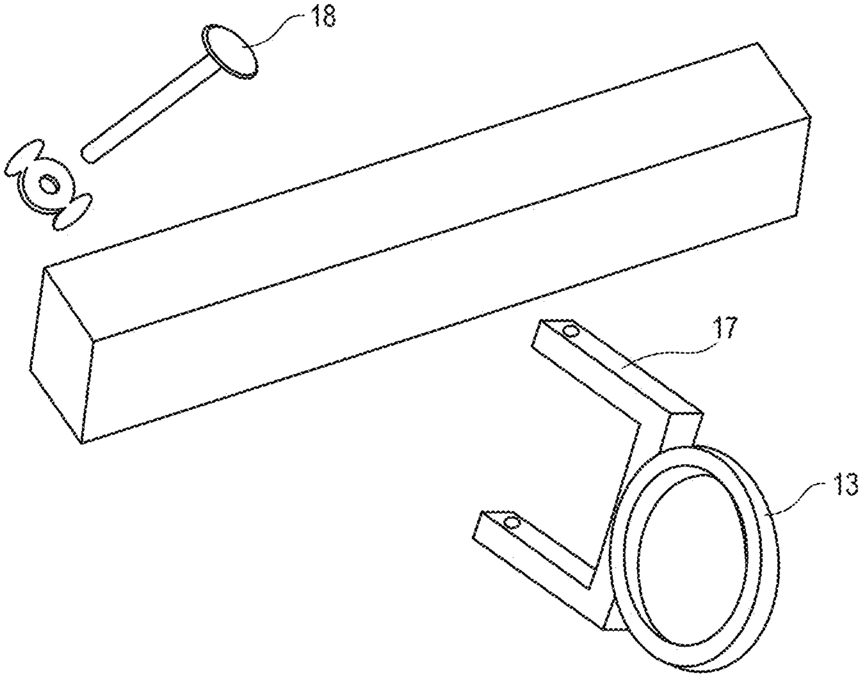
FIGS. 7A and 7B show two embodiments of a ring which can be attached to the ladder stand at the top, to be used to attach the cords to the top of the ladder stand.
Figure 7B:
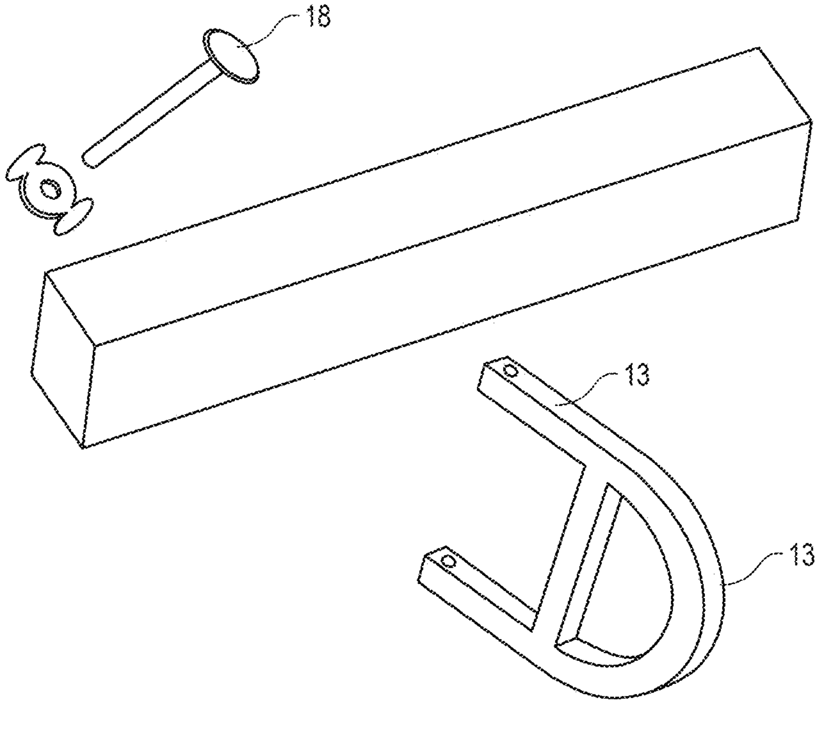

When the hunter reaches the top, he or she pulls cover 10 up to the desired seat level 6 of seat 4, disconnects ropes, or cords 12 from their belt loops and secures ropes, or cords, 12 to attachment rings 13 located on either side of seat 4. Alternatively, if cover 10 has a second plurality of holes **14*t*, the hunter may utilize the combination of holes 14*t* and attachment rings 13 to secure cover 10 in the desired extended orientation. The hunter can alternatively tie ropes, or cords, 12 to convenient places at the top of ladder 20 or secure the free ends of ropes, or cords, 12 to seat 4, or the structure that forms seat 4, for example with rings 13 as shown in FIGS. 7A and 7B. Bracket 17 slides onto an optional arm rest, gun rail, or other square tubular part of the ladder 20, and is secured with a bolt, or pin, 18 to close the open end of bracket 17**.

While seated, the hunter's feet and some portion of the hunter's legs remain inside the cover. When the hunter wishes to climb down ladder 20, he or she unties or disconnects ropes, or cords, 12 from the uppermost hoop 11 or, if present, holes 14*t*, and either lets cover 10 fall to ground G on its own, or attaches ropes, or cords, 12 to the their belt loops, or some other suitable attachment point, so that cover 10 descends with the hunter.

In one embodiment, if ropes, or cords, 12 are long enough, the hunter can leave ropes, or cords, 12 hanging loosely from the uppermost hoop 11 or, if present, holes 14*t*, and the ends of ropes, or cords, 12 will hang down far enough such that the hunter can still reach ropes, or cords, 12 when the hunter has descended to the ground, and has collapsed cover 10 at the bottom of ladder 20 by climbing down ladder 20. The hunter can then, if so desired, pull on ropes, or cords, 12 to pull cover 10 back up to the top of ladder 20 and secure ropes, or cords, 12 to ladder 20 or holes 14*b* at the bottom of cover 10, so that ladder 20 is covered and camouflaged when the hunter is not sitting at the top of ladder 20. Given the above, ropes, or cords, 12 can be of any suitable length depending on the overall height of cover 10 as disclosed above. In another instance, ropes, or cords, 12 are at least four feet, five feet, six feet, seven feet, eight feet, nine feet, or even 10 feet longer than the maximum height of cover 10. In still another embodiment, the length of ropes, or cords, 12 is at least 1.5 times the extended height of cover 10, at least 2 times the extended height of cover 10, or even at least 2.5 times the extended height of cover 10.

Figure 5:
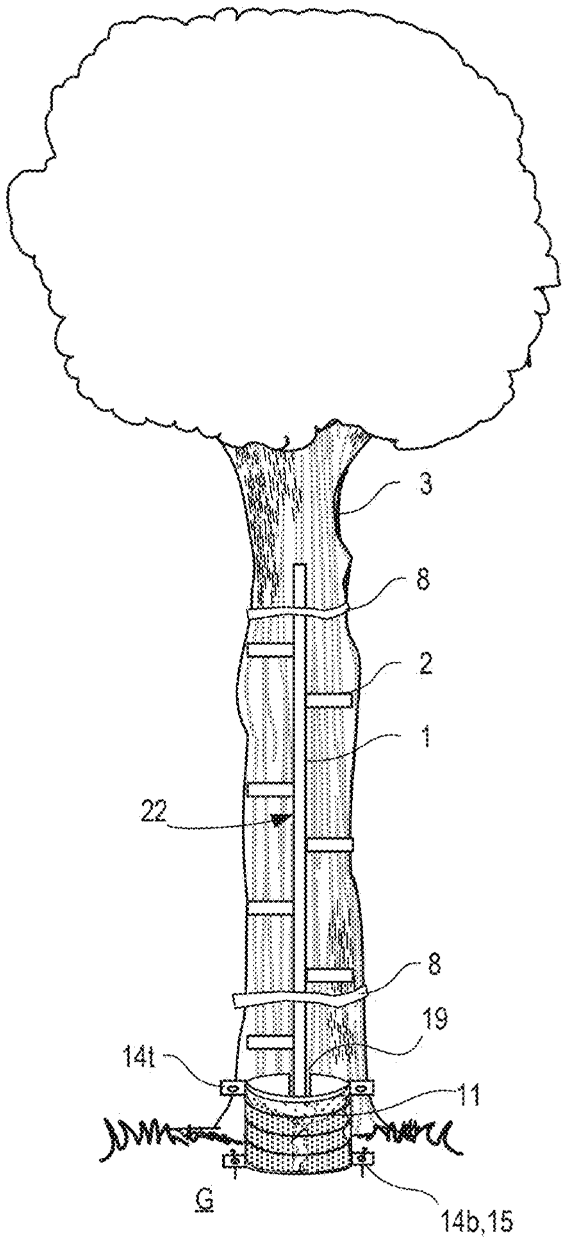
FIG. 5 is a front view of the cover almost fully collapsed on the ground, ready to be pulled up a stick ladder.
Figure 6:
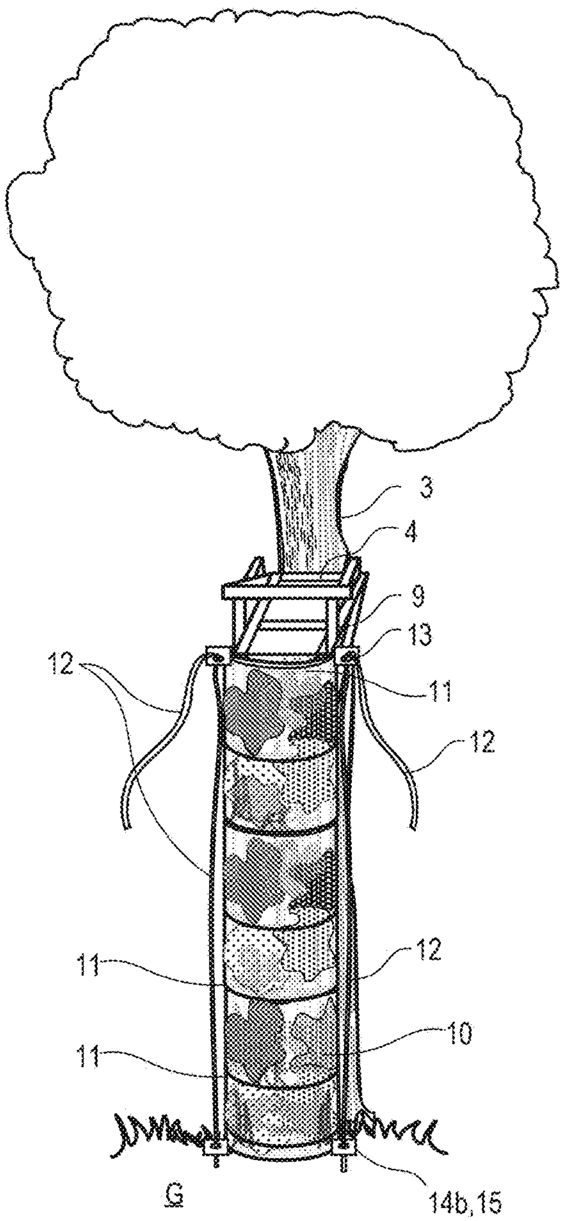
FIG. 6 is a front view, of the cover completely raised, unfolded and extended from the ground to the top of the ladder stand.

The invention can be used in the same way to cover and camouflage a stick ladder 22, as shown in FIG. 5, or any ladder other type of tree stand ladder regardless of whether such ladder is illustrated in the attached Figures. A stick ladder 22 has one rail 1 in the center with steps 2 that extend out either side of rail 1.

Clause 1: A ladder cover for a ladder, ladder stand or ladder stick, the ladder cover having a length, a width, a top edge, a bottom edge, an outside surface, an inside surface, and right and left sides, the ladder cover comprising: a flexible cover portion formed from a suitable fabric or other flexible material, wherein the length (or height) of the flexible cover is at least as long as the height of the ladder it is intended to cover; and a plurality of hoops sewn, or otherwise attached, to the inside surface of the flexible cover portion, wherein the plurality of hoops are located at suitable intervals from the bottom edge to the top edge of the cover, with each hoop being oriented to be substantially parallel with the bottom and top edges of the cover and the ground, wherein each of the plurality of hoops is formed to have a desired geometric shape (e.g., a circle, rectangle, oval or other shape) and size that fits horizontally around the ladder.

Clause 2: The ladder cover of clause 1, wherein each of the plurality of hoops having an opening designed to be located behind the ladder when the cover is installed on the ladder in a vertical concealable position.

Clause 3: The ladder cover of any of clauses 1 or 2, wherein each of the plurality of the hoops are made of wire, plastic or other material which is flexible but retains a desired shape.

Clause 4: The ladder cover of any of clauses 1-3, wherein the cover portion has a plurality of bottom holes for securing the cover portion of the ladder cover to the ground at the bottom edge of the cover portion with stakes.

Clause 5: The ladder cover of any of clauses 1-3, wherein the cover portion has a plurality of grommet reinforced bottom holes for securing the cover portion of the ladder cover to the ground at the bottom edge of the cover portion with stakes.

Clause 6: The ladder cover of any of clauses 1-5, wherein the cover portion has a plurality of top holes for securing the cover portion of the ladder cover to any suitable top portion of the ladder, or ladder stand.

Clause 7: The ladder cover of any of clauses 1-5, wherein the cover portion has a plurality of grommet reinforced top holes for securing the cover portion of the ladder cover to any suitable top portion of the ladder, or ladder stand.

Clause 8: The ladder cover of any of clauses 6 or 7, wherein the top holes are designed to be secured to one or more of a seat, an arm rest, a gun rail, or other top portion of the ladder.

Clause 9: The ladder cover of any of clauses 4-8, further comprising a plurality of cords designed to permit the raising and lowering of the cover portion via at least one of the plurality of bottom holes and/or the plurality of top holes.

Clause 10: The ladder cover of clause 9, wherein the plurality of cords each have a length that is approximately twice as long as the height of the ladder and/or cover portion.

Clause 11: The ladder cover of clause 10, wherein the plurality of cords are designed to be attached to the top of the ladder via a ring and bolt.

Clause 12: The ladder cover of clause 11, wherein the ring and bolt can further be securely connected to the top of the ladder.

Clause 13: The ladder cover of any of clauses 1-12, wherein the plurality of hoops are spaced about 30 centimeters apart along the entire height of the cover portion.

Although the invention has been described in detail with particular reference to certain embodiments detailed herein, other embodiments can achieve the same results. Variations and modifications of the present invention will be obvious to those skilled in the art and the present invention is intended to cover in the appended claims all such modifications and equivalents.

What is claimed is:

1. A ladder cover for a ladder, ladder stand, or ladder stick, the ladder cover comprising:

a flexible cover portion formed from a fabric or other flexible material, wherein a fully extended height of the flexible cover portion is configured to be at least as long as a height of an optionally present ladder, ladder stand, or stick ladder that the flexible cover portion is intended to cover when the flexible cover portion is in fact fully extended; and a plurality of hoops that are all sewn, or otherwise attached, to one surface of the flexible cover portion, wherein the flexible cover portion is able to collapse in an accordion fashion to a collapsed height of equal to or less than double the distance between two adjacent hoops of the plurality of hoops when the flexible cover portion is fully extended, wherein the plurality of hoops are located at various intervals from a bottom edge to a top edge of the ladder cover such that all of the plurality of hoops are oriented to be substantially parallel with the bottom and top edges of the ladder cover, wherein each of the plurality of hoops is formed to have a desired geometric shape and size that is configured to fit around and encircle the optionally present ladder, ladder stand, or ladder stick intended to be covered when the ladder cover is fully extended, and wherein the flexible cover portion has a vertical opening, or a vertical slit, formed therein and all of the plurality of hoops each individually have an opening, or gap, formed therein such that when the vertical opening, or the vertical slit, of the flexible cover portion is aligned with all of the openings, or gaps, of the plurality of hoops a combined full-length slit, or combined full-length gap, running vertically along an entirety of the fully extended height of the of the flexible cover portion of the ladder cover is formed.

2. The ladder cover of claim 1, wherein each of the plurality of the hoops are made of wire, plastic or other material which is flexible but retains a desired shape.

3. The ladder cover of claim 1, wherein the flexible cover portion has a plurality of bottom holes designed to secure a bottom of the flexible cover portion to the ground with stakes.

4. The ladder cover of claim 1, wherein the flexible cover portion has a plurality of grommet reinforced bottom holes designed to secure a bottom of the flexible cover portion to the ground with stakes.

5. The ladder cover of claim 1, wherein the flexible cover portion has a plurality of top holes configured to secure a top of the flexible cover portion to any desired attachment point at a top of the optionally present ladder, ladder stand, or stick ladder intended to be covered.

6. The ladder cover of claim 1, wherein the flexible cover portion has a plurality of grommet reinforced top holes designed to secure a top of the flexible cover portion to any desired attachment point at a top of the optionally present ladder, ladder stand, or stick ladder intended to be covered.

7. The ladder cover of claim 1, wherein the flexible cover portion has a plurality of top holes designed to secure a top of the flexible cover portion to at least one part of a top portion of the optionally present ladder, ladder stand, or stick ladder intended to be covered.

8. The ladder cover of claim 1, further comprising a plurality of ropes designed to permit the raising and lowering of the flexible cover portion via at least one of a plurality of top holes.

9. The ladder cover of claim 8, wherein the plurality of ropes each have a length that is approximately twice as long as the height of the optionally present ladder, ladder stand, or stick ladder that is intended to be covered and/or approximately twice as long as the fully extended height of the flexible cover portion.

10. The ladder cover of claim 8, wherein the plurality of ropes are designed to be attached to a top of the optionally present ladder, ladder stand, or stick ladder that is intended to be covered via a ring and bolt.

11. The ladder cover of claim 10, wherein the ring and bolt can further be securely connected to a top of the optionally present ladder, ladder stand, or stick ladder that is intended to be covered.

12. The ladder cover of claim 1, wherein the plurality of hoops are spaced about 12 inches apart along the fully extended height.

* * * * *